Jan. 21, 1969  J. J. McCARTHY  3,422,502
OVERLOAD-RELEASE COUPLING
Filed Aug. 25, 1967
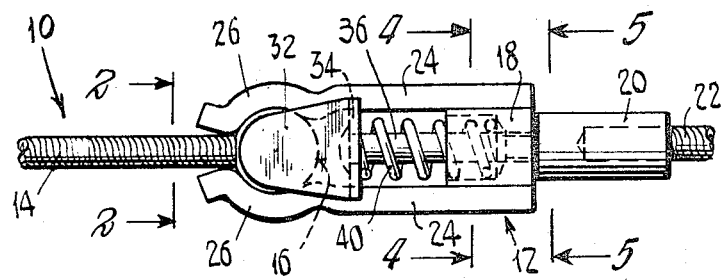
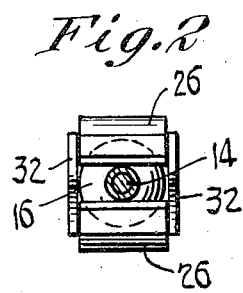
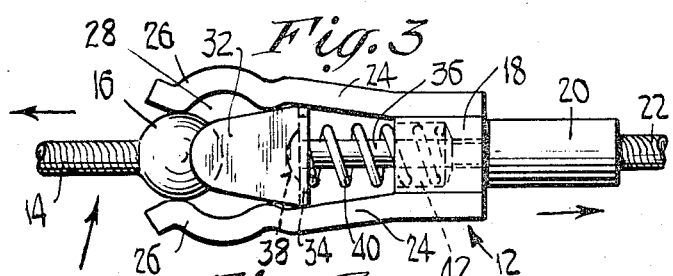
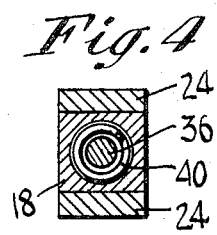
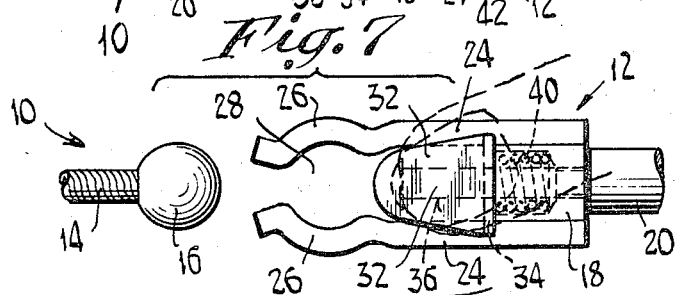
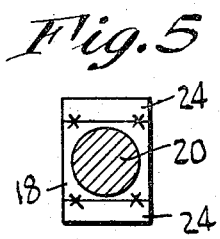
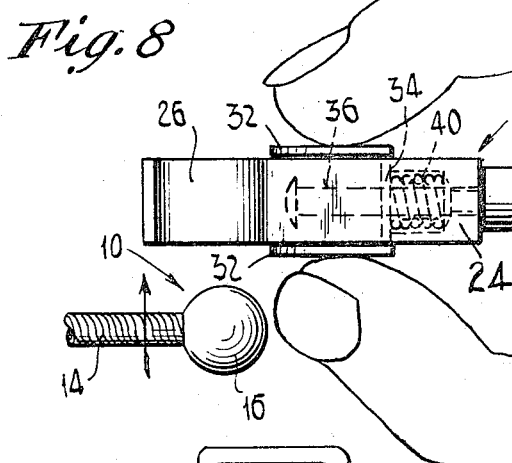
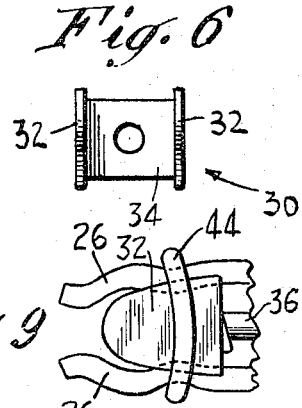
INVENTOR.
John J. McCarthy
BY
H. Gilroy Lehmann
AGENT United States Patent Office 3,422,502
Patented Jan. 21, 1969

3,422,502
OVERLOAD-RELEASE COUPLING
John J. McCarthy, Weston, Conn., assignor to Norco, Inc., Ridgefield, Conn., a corporation of Connecticut
Filed Aug. 25, 1967, Ser. No. 663,383
U.S. Cl. 24—123                                                          10 Claims
Int. Cl. F16g 11/02; A44b 19/00

ABSTRACT OF THE DISCLOSURE

An overload-release coupling for releasably securing two members together, comprising a shank having at one end an enlargement, and a receiver part having two opposed, spaced yieldable jaws which yieldably grip the enlargement and yield away from each other to release the enlargement and shank when excess force is applied to the shank. Access side openings at the jaws permit the insertion of the enlargement between the latter without requiring them to be sprung apart. A manually operable slide normally covers the side openings, and can be retracted to permit the insertion of the enlargement.

Cross references to related applications

Copending application of Clarence G. Pressley, Ser. No. 627,776, filed Apr. 3, 1967 and having common ownership with the present application.

Background

This invention relates to separable couplings for securing together cables, rods and the like, and more particularly to couplings which are intended to release when subjected to a predetermined overload.

Heretofore various types of overload-release couplings have been proposed and produced. Generally these involved yieldable jaws which were forced apart or shifted to retracted positions in order to accept the enlargement or ball of the cooperable or male member of the coupling. Such structures were somewhat costly and complicated, involving a multiplicity of parts which had to be carefully fitted and assembled. Moreover, in some cases difficulty was encountered in the quick joining of the coupling members, due to the obstruction represented by the yieldable jaws, or at times due to the nature of the conditioning action required to place the jaws in readiness for acceptance of the cooperable member.

Summary

The above disadvantages and drawbacks of prior overload-release couplings are obviated by the present invention, and one object of the invention is to provide a novel and improved quick-release and overload release coupling wherein the members are very easily and quickly joined, and which coupling is especially simple and economical to fabricate. This is accomplished by the provision of a male coupling member comprising a shank and ball or enlargement thereon, and a female or receiver member comprising a block to which two yieldable jaws are secured to form a socket which is open at its sides. Thus the enlargement of the male coupling member can be easily and quickly placed in the socket through a side opening, and its removal effected by forcing it forward past the retaining jaws, which yield when enough force is used. A manually operable slide is provided on the receiver member to normally close the side openings and hold captive the enlargement. This slide can be manually, easily and quickly retracted to reveal and clear the side openings at the time that the coupling members are to be coupled.

Additional objects and features of the invention are to provide an improved overload-release coupling which is strong and sturdy, reliable in its operation, small and compact, easily understood and operated, and able to successfully withstand adverse conditions of use such as vibration and other deleterious environmental factors.

Other features and advantages will hereinafter appear.

In the drawings:

FIG. 1 is a side elevational view of the improved overloading-release coupling as provided by the invention, shown in its assembled condition.

FIG. 2 is a transverse sectional view, taken on the line 2—2 of FIG. 1.

FIG. 3 is a view like that of FIG. 1, but showing the coupling in the process of being released in response to the application of excessive tensional load.

FIG. 4 is a transverse section, taken on the line 4—4 of FIG. 1.

FIG. 5 is a transverse section, taken on the line 5—5 of FIG. 1.

FIG. 6 is a front elevational view of the latching slide part of the coupling, per se.

FIG. 7 is an exploded side elevational view of the coupling, illustrating the retracted position of the latching slide and showing the male coupling member as separated from the receiver member.

FIG. 8 is a top plan view of the coupling, illustrating the process of joining the members. The latching slide is shown as being held in its retracted position whereby the male coupling member may be placed in the socket of the receiver through a side opening thereof.

FIG. 9 is a fragmentary side elevational view of a receiver member having a locking ring which prevents overload release.

FIG. 10 is a plan view of the locking ring of FIG. 9.

Referring now particularly to the drawings, the coupling is seen to be constituted of a first or male part 10 which is adapted to be received in a socket-providing receiver or female part 12. The first part 10 comprises a shank 14 on which there is provided at one end an enlargement 16 shown as having the shape of a ball. The shank 14, may, for example, comprise a flexible cable. Or, it may be constituted of a rigid rod, or other suitable, somewhat slender structure.

In accordance with the invention, the receiver part 12 comprises a block 18 having a cylindrical shank portion 20 in which there is secured one end of a flexible cable, rod or wire 22.

Secured to opposite side surfaces of the block 18 which is of substantially rectangular cross section, are yieldable jaw pieces 24, constituted preferably of metal sheet or strip stock. The jaw pieces 24 may be welded to the block body 18 or otherwise secured in any suitable manner. The jaw pieces 18 extend or project from one end (the forward end) of the block 18 in substantially parallel, spaced relation, and have curved formations or jaws 26 adapted to conform to the shape of the enlargement 16 and to partially encircle and grip the enlargement, as illustrated in FIG. 1.

The jaw pieces 24 may be constituted of spring metal, or else they may be constituted of metal which is not especially resilient. In either circumstance, the jaw pieces 24 are yieldable, and may be forced laterally in directions away from each other, as by the application of an excessive tensional force to the shank 14 in a direction tending to withdraw the enlargement 16 from right to left as viewed in FIG. 1. Such withdrawal, and the yielding of the jaw pieces 24 is illustrated in FIG. 3.

As an example, the excessive force which is required to effect the release of the coupling illustrated in FIG. 3 may be on the order of 400 pounds, plus or minus a small percentage.

With the illustrated formations of the jaw pieces 24, side openings exist at the socket formed by the jaws 26.

Such side openings are designated by the numeral 28, and normally are closed, in accordance with the invention, by a manually operable slide 30 which is movably mounted on the receiver part 12 and is movable thereon between a retracted position illustrated in FIGS. 7 and 8 wherein it uncovers the side openings 28 to permit passage of the enlargement 16 into the socket, and an advanced position illustrated in FIGS. 1 and 3 wherein it covers and blocks said side openings and prevents the enlargement 16 from leaving the socket via said openings. The slide 30 is generally U-shaped, and comprises a pair of arms 32 connected by an apertured yoke portion 34 which receives a stud or bolt 36 that is threaded into the block 18 and extends between the jaw pieces 24 in spaced relation thereto. The bolt 36 has a head 38 by which the slide 30 is held captive on the receiver member 12 while being permitted to move between the extended or advanced and the retracted positions illustrated. Also, a helical compression spring 40 is carried by the bolt 36, engaging the apertured yoke portion 34 of the slide and extending in a recess 42 in the block 18.

It will be seen from an inspection of FIG. 8 that the side arms 32 of the slide are exposed and accessible at opposite sides of the block 18, whereby they may be readily gripped between the thumb and forefinger, for the purpose of effecting retraction of the slide.

Where the coupling device is intended for but a single or one-time use, the jaw pieces 24 need not be resilient but instead may be of relatively soft steel or similar material inasmuch as the essential requirement in such circumstance is for them to yield under a load imposed on the shank 14 of the required amount, given above by way of example as 400 pounds.

In the event that the coupling is intended to be reused a number of times, then the jaw pieces 24 should be of resilient or spring stock, whereby they will retain their original given positions after being spread apart during the release of the enlargement 16.

It will now be understood from the foregoing that I have provided a novel and improved overload release coupling by which two cable ends, rods or other structural parts may be secured to each other, and released in response to a predetermined overload, considering the normal holding capacity of the jaw pieces. The coupling is seen to be especially simple, involving relatively few parts which may be economically fabricated and assembled. In particular, the coupling is so constituted that the members thereof may be easily and quickly assembled without requiring separation of the jaw pieces, by the mere act of withdrawing or retracting the slide member 30 and then placing the enlargement 16 of the coupling member 10 into the socket through a side opening 28 thereof, after which the enlargement is held captive by release of the slide and its return under the action of the compression spring 40. The slide loading or assemblage of the coupling members is especially important where the members are so constituted that their intended release involves a relatively large overload force, requiring the jaw pieces 24 to be of relatively heavy construction whereby they are not easily separated. With such heavy construction of the jaw pieces, it will be understood that the assembly of the coupling members in an action which is opposite to their release, requiring separation of the jaw pieces, could be extremely difficult, particularly under adverse conditions. The coupling is seen to be foolproof, and sturdy and reliable in its functioning under adverse environmental conditions.

In some circumstances it may be desirable to prevent release of the coupling in response to an overload. A construction which functions in this manner is illustrated in FIGS. 9 and 10. Here a locking ring 44 is provided on the receiver member, said ring being retained in the depressions of the jaw pieces 24, 26 as illustrated. The ring 44 normally prevents the jaw pieces from spreading apart under increased loads that would cause the separation and release shown in FIG. 3. It will be understood that the ring 44, which has a rectangular shape as seen in FIG. 10, can be forced over and can force inward the jaw pieces, fitting outside of the slide 30, 32. As seen in FIG. 9, the ring 44 has curved sides to provide clearance for admitting the enlargement 16 when the slide 30, 32 is in its retracted position.

Variations and modifications may be made within the scope of the claims, and portions of the improvement may be used without others.

I claim:
1. An overload-release coupling comprising, in combination:
 (a) a first part having a shank portion and an enlargement at one end of the shank portion,
 (b) a receiver part comprising a body portion and means on said body portion providing a socket for receiving and yieldably retaining said first part,
 (c) said socket means including at least one yieldable jaw engageable with the enlargement of the first part to grip the same, wherein the improvement comprises:
 (d) said socket means having a side opening through which the enlargement of the first part can be passed to insert it in the socket without appreciably displacing said yieldable jaw, and
 (e) a manually-operable slide movably mounted on said receiver part and movable thereon between a retracted position wherein it uncovers said side opening to permit passage of the enlargement into the socket, and an advanced position wherein it covers and blocks said side opening and prevents the enlargement from leaving the socket via said opening,
 (f) said first part being normally separable from the receiver part when experiencing a predetermined overload pull on its shank portion by virtue of the enlargement being forced from the socket in consequence of yielding of said jaw to force exerted on it by the enlargement.

2. The invention as in claim 1, wherein:
 (a) the shank of the said first part comprises a flexible cable,
 (b) said enlargement comprising a ball secured to the cable.

3. The invention as in claim 1, wherein:
 (a) the receiver part comprises two yieldable jaws defining opposite sides of said socket.

4. The invention as defined in claim 3, wherein:
 (a) the receiver part comprises a rigid block,
 (b) said yieldable jaws comprising spring strips secured to opposite sides of said block and extending past one end thereof.

5. The invention as defined in claim 4, wherein:
 (a) the slide comprises a U-shaped member having an apertured yoke portion and a pair of substantially parallel spaced arms,
 (b) said socket means having a second side opening opposite the first opening,
 (c) said spaced arms covering and uncovering the side openings respectively,
 (d) a headed bolt secured in the block of the receiver part and extending between the yieldable jaws in spaced relation thereto,
 (e) said bolt passing through the apertured yoke of the slide and retaining the latter captive on the receiver.

6. The invention as defined in claim 5, wherein:
 (a) means are provided, comprising a coil spring carried by said bolt, for yieldably urging the slide to its advanced position.

7. The invention as defined in claim 5, wherein:
 (a) the arms of the slide are exposed and accessible at opposite sides of the receiver, said arms constituting finger grips for engagement by the thumb and forefinger for the purpose of retracting the slide.

8. The invention as defined in claim 1, wherein:
(a) a locking ring is provided, encircling said socket means and one yieldable jaw, for preventing yielding of the jaw and release of the enlargement.

9. The invention as defined in claim 8, wherein:
(a) said socket means at its exterior defines a rectangular configuration,
(b) said locking ring being of rectangular shape and closely fitting said socket means,
(c) said slide being movable inside the locking ring.

10. The invention as defined in claim 9, wherein:
(a) said locking ring has curved sides to provide clearance for admitting the enlargement when the slide is retracted.

References Cited

UNITED STATES PATENTS

| 1,682,994 | 9/1928 | Simon. | |
| 2,610,355 | 9/1952 | Becker | 287—89 X |

FOREIGN PATENTS 898,529  4/1945  France.

BERNARD A. GELAK, *Primary Examiner.*

U.S. Cl. X.R.

24—201, 230